US009853735B1

(12) United States Patent
Lin et al.

(10) Patent No.: US 9,853,735 B1
(45) Date of Patent: Dec. 26, 2017

(54) OPTICAL TRANSMITTER AND METHOD THEREOF

(71) Applicant: REALTEK SEMICONDUCTOR CORPORATION, HsinChu (TW)

(72) Inventors: Chia-Liang (Leon) Lin, Fremont, CA (US); Chi-Kung Kuan, Taiwan (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/228,638

(22) Filed: Aug. 4, 2016

(51) Int. Cl.
  *H04B 10/12* (2006.01)
  *H04B 10/04* (2006.01)
  *H04B 10/50* (2013.01)
  *G01J 1/44* (2006.01)
  *H04B 10/077* (2013.01)
  *H04B 10/564* (2013.01)

(52) U.S. Cl.
  CPC ............. *H04B 10/503* (2013.01); *G01J 1/44* (2013.01); *H04B 10/0775* (2013.01); *H04B 10/564* (2013.01); *G01J 2001/446* (2013.01); *H04B 10/504* (2013.01)

(58) Field of Classification Search
  None
  See application file for complete search history.

(56) References Cited

U.S. PATENT DOCUMENTS

| 5,966,395 A * | 10/1999 | Ikeda ................. H01S 5/06832 372/31 |
| 7,869,478 B2 * | 1/2011 | Lee ..................... H01S 5/06832 372/29.021 |
| 2003/0090289 A1 * | 5/2003 | Morley ................ H01S 5/0014 372/38.1 |
| 2003/0165168 A1 * | 9/2003 | Murata ................... H01S 5/042 372/38.02 |
| 2004/0028099 A1 * | 2/2004 | Hongo ................. G02F 1/0123 372/38.02 |
| 2005/0084202 A1 * | 4/2005 | Smith .................... B82Y 20/00 385/14 |
| 2005/0238072 A1 * | 10/2005 | Uesaka ................ H01S 5/0683 372/38.02 |
| 2006/0007971 A1 * | 1/2006 | Sato ........................ H01S 5/062 372/38.02 |
| 2008/0272830 A1 * | 11/2008 | Steedman ........ G01R 19/16552 327/530 |

(Continued)

*Primary Examiner* — Ken N Vanderpuye
*Assistant Examiner* — Jai Lee
(74) *Attorney, Agent, or Firm* — Sughrue Mion, PLLC

(57) ABSTRACT

An apparatus includes: a laser driver configured to output a laser diode current in accordance with a transmit data, a bias control code, and a modulation control code, a laser diode configured to receive the laser diode current and output a light signal, a photodiode configured to receive the light signal and output a photodiode current, a reference driver configured to output a reference current in accordance with the transmit data, the transmit enable signal, a reference bias code, and a reference modulation code, a two-fold comparison circuit configured to compare the photodiode current and the reference current and output a first decision and a second decision, and a DSP configured to adjust the bias control code and the modulation control code in accordance with the first decision and a second decision. A method provides reliable light output using the described apparatus.

13 Claims, 8 Drawing Sheets

(56) References Cited

U.S. PATENT DOCUMENTS

2008/0308716 A1* 12/2008 Byren ................ H04B 10/6911
250/214 R
2013/0177325 A1* 7/2013 Kuan ................... H04B 10/564
398/182

* cited by examiner

Transfer characteristic of the MPD

Transfer characteristic of the laser diode

OPTICAL TRANSMITTER AND METHOD THEREOF

BACKGROUND

Field

The present disclosure generally relates to an optical transmitter.

Description of Related Art

Persons of ordinary skill in the art understand terms and basic concepts related to microelectronics that are used in this disclosure, such as "voltage," "signal," "logical signal," "resistor," "capacitor," "inductor," "current," "laser diode," "photodiode," "current source," "digital-to-analog converter (DAC)," "analog-to-digital converter (ADC)," "comparator," "trans-impedance amplifier (TIA)," "low-pass filter," "transistor," "NMOS (n-channel metal oxide semiconductor)," "circuit node," "ground node," and "differential pair." Terms and basic concepts like these are apparent to those of ordinary skill in the art and thus will not be explained in detail here.

In this disclosure, a logical signal is a signal which can assume two states: "high" and "low," which can also be re-phrased as "1" and "0." For brevity, a logical signal in the "high" ("low") state is simply stated as the logical signal is "high" ("low"), or alternatively, the logical signal is "1" ("0"). Also, for brevity, quotation marks may be omitted and the immediately above is simply stated as the logical signal is high (low), or alternatively, the logical signal is 1 (0), with the understanding that the statement is made in the context of describing a state of the logical signal.

A logical signal is said to be asserted when it is high. A logical signal is said to be de-asserted when it is low.

This disclosure is disclosed in an engineering sense, wherein a first quantity is said to be equal to a second quantity when a difference between the first quantity and the second quantify is smaller than a specified tolerance and thus negligible.

A burst mode optical transmitter is used in applications such as gigabit passive optical network (GPON). A functional block diagram of a prior art burst mode laser transmitter 100 is depicted in FIG. 1A. Transmitter 100 includes: a laser driver 110 for receiving a transmit data TXD, a transmit enable signal TEN, a bias current $I_B$, and a modulation current $I_M$, and outputting an output current $I_O$; a laser diode 120 for receiving the output current $I_O$ and emitting a light signal, including a front-side part labeled by 121 and a back-side part labeled by 122; a optical fiber 130 for receiving the front-side part of the light signal 121; an photodiode (PD) 140 for receiving the back-side part of the light signal 122 from a back facet of the laser diode 120 and outputting a photodiode current $I_{PD}$; an automatic power control (APC) block 150 for receiving the photodiode current $I_{PD}$ along with the transmit data TXD and the transmit enable signal TEN and outputting the bias current $I_B$ and the modulation current $I_M$. Throughout this disclosure, $V_{DD}$ denotes a power supply node. An exemplary timing diagram for the transmitter 100, in an artist's rendering, is shown in FIG. 1B. When the transmit enable TEN signal is de-asserted, the laser driver 110 is disabled and the output current $I_O$ is nil; in this case, the light signal emitted by the laser diode 120 is also nil. When the TEN signal is asserted, the laser driver 110 is enabled and the output current $I_O$ will be modulated by the transmit data TXD in accordance with the bias current $I_B$ and the modulation current $I_M$. As shown in the figure, if ideal, $I_O$ will be equal to $I_B$ when TXD is low, or equal to $I_B+I_M$ when TXD is high. Consequently, the light signal emitted by the laser diode 120 will be modulated by the transmit data TXD such that the intensity of the light signal will be equal to a low level $P_L$ when TXD is low or equal to a high level $P_H$ when TXD is high, wherein $P_L$ and $P_H$ are determined by $I_B$ and $I_B+I_M$, respectively, via a transfer characteristic of the laser diode 120 that is temperature dependent. When the laser driver 110 is enabled, the light signal being emitted by the laser diode 120 also illuminates the photodiode 140 and causes the photodiode 140 to transmit the photodiode current $I_{PD}$ such that $I_{PD}$ is related to the intensity of the light signal via a transfer characteristic of the photodiode 140. Therefore, the photodiode current $I_{PD}$ can be used to detect the intensity of the light signal. Ideally, the photodiode current $I_{PD}$ is equal to a low current $I_L$ when the light intensity is of the low level $P_L$, and equal to a high current $I_H$ when the light intensity is of the high level $P_H$. APC 150 receives the photodiode current $I_{PD}$. When the transmit data TXD is low, APC 150 compares $I_{PD}$ with a low reference current $I_{REFL}$; if $I_{PD}$ is greater (lower) than $I_{REFL}$, it indicates $I_B$ is too large (small) and needs to be decreased (increased). When the transmit data TXD is high, APC 150 compares $I_{PD}$ with a high reference current $I_{REFH}$; if $I_{PD}$ is greater (smaller) than $I_{REFH}$, it indicates $I_B+I_M$ is too large (small) and needs to be decreased (increased). $I_B$ and $I_M$ are thus adjusted in a closed loop manner so as to make $I_{PD}$ equal to $I_{REFL}$ when TXD is low and equal to $I_{REFH}$ when TXD is high. The two reference currents $I_{REFL}$ and $I_{REFH}$ are determined in accordance with a combination of the characteristic of laser diode 120, the characteristic of photodiode 140, and the temperature, such that when $I_{PD}$ is equal to the low (high) current $I_{REFL}$ ($I_{REFH}$), the light intensity is equal to the desired low (high) level $P_L$ ($P_H$). In practice, however, photodiode 140 is usually packaged with a very large series inductance along with a very large shunt capacitance, so that $I_{PD}$ does not always track the light intensity accurately. Instead, as shown in the figure, a practical $I_{PD}$ often exhibits a ringing behavior, due to the existence of the series inductance and the shunt capacitance. This greatly hinders the ability of the APC 150 to accurately detect and control the intensity of the light signal.

What is disclosed is a method for accurately detect and control the intensity of the light signal even though the photocathode current exhibits a ringing behavior. Features of conventionally known optical transmitters are described by U.S. Pat. Nos. 8,665,921 and 8,548,336.

BRIEF SUMMARY

An objective of exemplary embodiments of the inventive concept is to control an intensity of a light signal such that the light signal is of a first target level when a transmit data is 0 and of a second target level when the transmit data is 1.

In an embodiment, an optical transmitter includes: a laser driver configured to output a laser diode current in accordance with a transmit data, a bias control code, and a modulation control code; a laser diode configured to receive the laser diode current and output a light signal; a monitoring photodiode configured to receive the light signal and output a monitoring photodiode current; a reference driver configured to output a reference current in accordance with the transmit data, a reference bias code, and a reference modulation code; a two-fold comparison circuit configured to receive the monitoring photodiode current and the reference current and output a first decision and a second decision; and a digital signal processor configured to receive the first decision and the second decision and output the bias control code, the modulation control code, the reference bias code, and the reference modulation code in accordance with a first target level and a second target level, wherein: the first decision is a result of comparison between a mean level of the monitoring photodiode current and a mean level of the reference current, and the second decision is a result of comparison between a mean amplitude of the monitoring photodiode current and a mean amplitude of the reference current. In an embodiment, the two-fold comparison circuit includes a mean level comparison circuit configured to establish the first decision by comparing the mean level of the monitoring photodiode current and the mean level of the reference current, and a mean amplitude comparison circuit configured to establish the second decision by comparing the mean amplitude of the monitoring photodiode current with the mean amplitude of the reference current. In an embodiment, the two-fold comparison circuit includes a trans-impedance amplifier, a low-pass filter, and a rectifier. In an embodiment, the mean level of the monitoring photodiode current is detected by using a trans-impedance amplifier followed by a low-pass filter. In an embodiment, the mean level of the reference current is detected by using a trans-impedance amplifier followed by a low-pass filter. In an embodiment, the mean amplitude of the monitoring photodiode current is detected by using a rectifier rectifying a monitoring photodiode voltage converted from the monitoring photodiode current using a trans-impedance amplifier. In an embodiment, the mean amplitude of the reference current is detected by using a rectifier rectifying a reference voltage converted from the reference current using a trans-impedance amplifier. In an embodiment, the reference bias code and the reference modulation code are established based on the first target level, the second target level, and an optical-to-electrical transfer characteristic of the monitoring photodiode.

In an embodiment, a method includes: specifying a first target level and a second target level of light intensity; finding a reference bias current and a reference modulation current based on the first target level and the second target level in accordance with an optical-to-electrical transfer characteristic; emitting a light signal by modulating a laser diode current in accordance with a transmit data, a bias control code, and a modulation control code; receiving a monitoring photodiode current excited by the light signal; establishing a reference current in accordance with the transmit data, the reference bias current, and the reference modulation current; comparing a mean level of the monitoring photodiode current with a mean level of the reference current to determine a first decision; comparing a mean amplitude of the monitoring photodiode current with a mean amplitude of the reference current to determine a second decision; and adjusting the bias control code and the modulation control code in accordance with the first decision and the second decision. In an embodiment, the mean level of the monitoring photodiode current is detected by using a trans-impedance amplifier followed by a low-pass filter. In an embodiment, the mean level of the reference current is detected by using a trans-impedance amplifier followed by a low-pass filter. In an embodiment, the mean amplitude of the monitoring photodiode current is detected by using a rectifier rectifying a monitoring photodiode voltage converted from the monitoring photodiode current using a trans-impedance amplifier. In an embodiment, the mean amplitude of the reference current is detected by using a rectifier rectifying a reference voltage converted from the reference current using a trans-impedance amplifier. In an embodiment, the reference bias code and the reference modulation code are established based on the first target level, the second target level, and an optical-to-electrical transfer characteristic of the monitoring photodiode.

DETAILED DESCRIPTION OF EXEMPLARY EMBODIMENTS

The present disclosure relates to an optical transmitter. While the specification describes several example embodiments of the invention considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of exemplary embodiments.

Figure 1A:
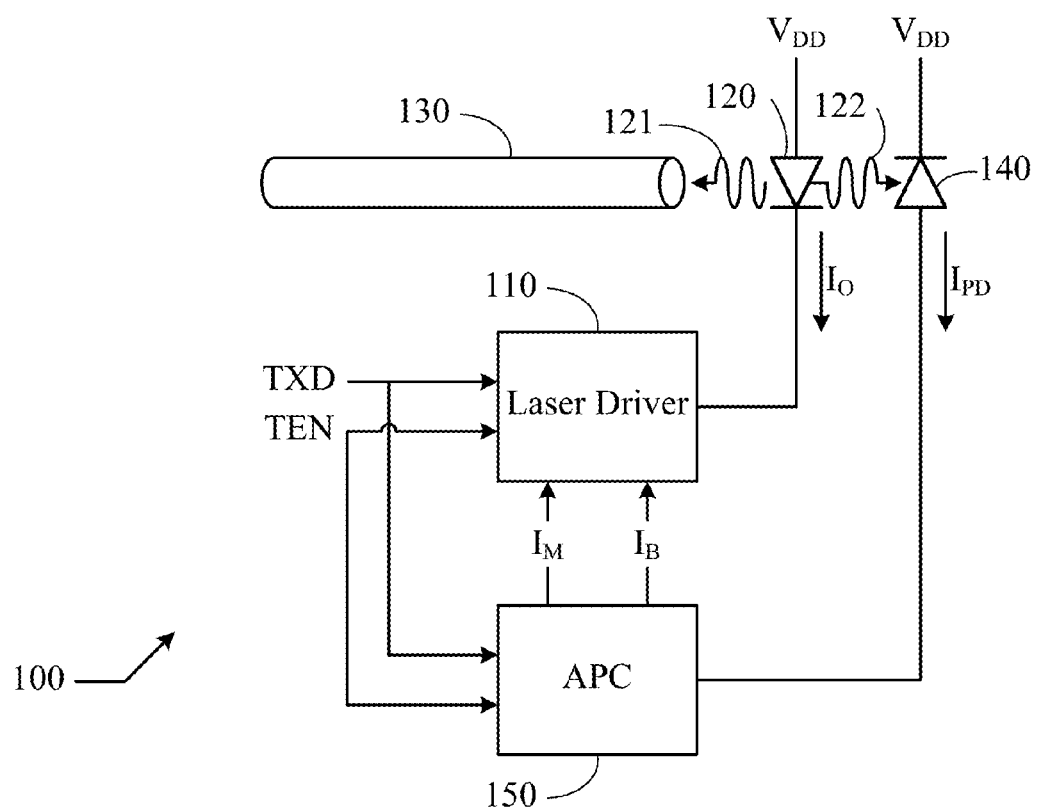
FIG. 1A shows a functional block diagram of a burst-mode laser transmitter.
Figure 1B:
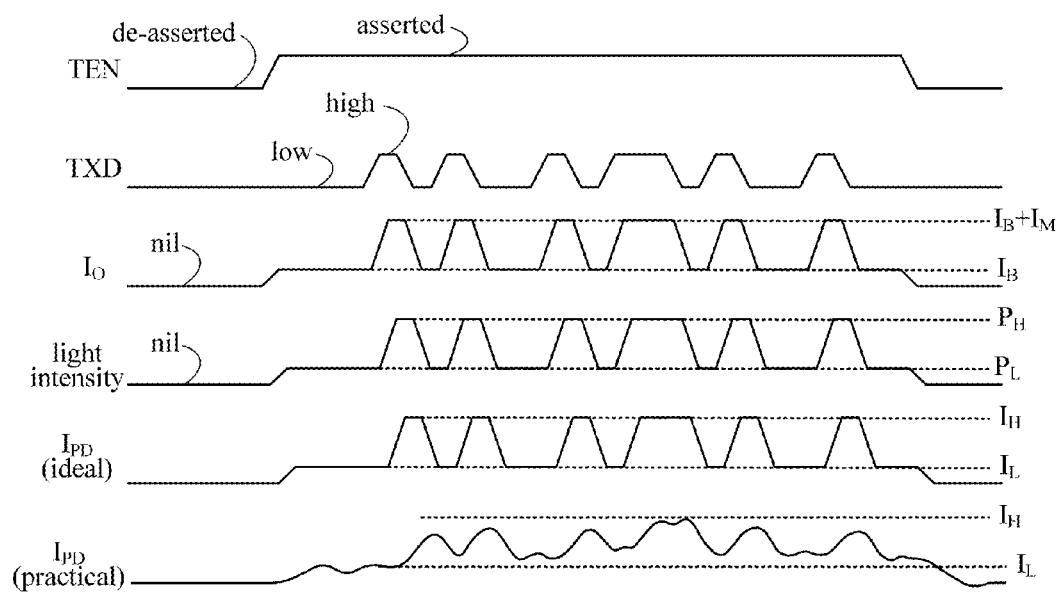
FIG. 1B shows an exemplary timing diagram of the burst-mode laser transmitter of FIG. 1A.
Figure 2:
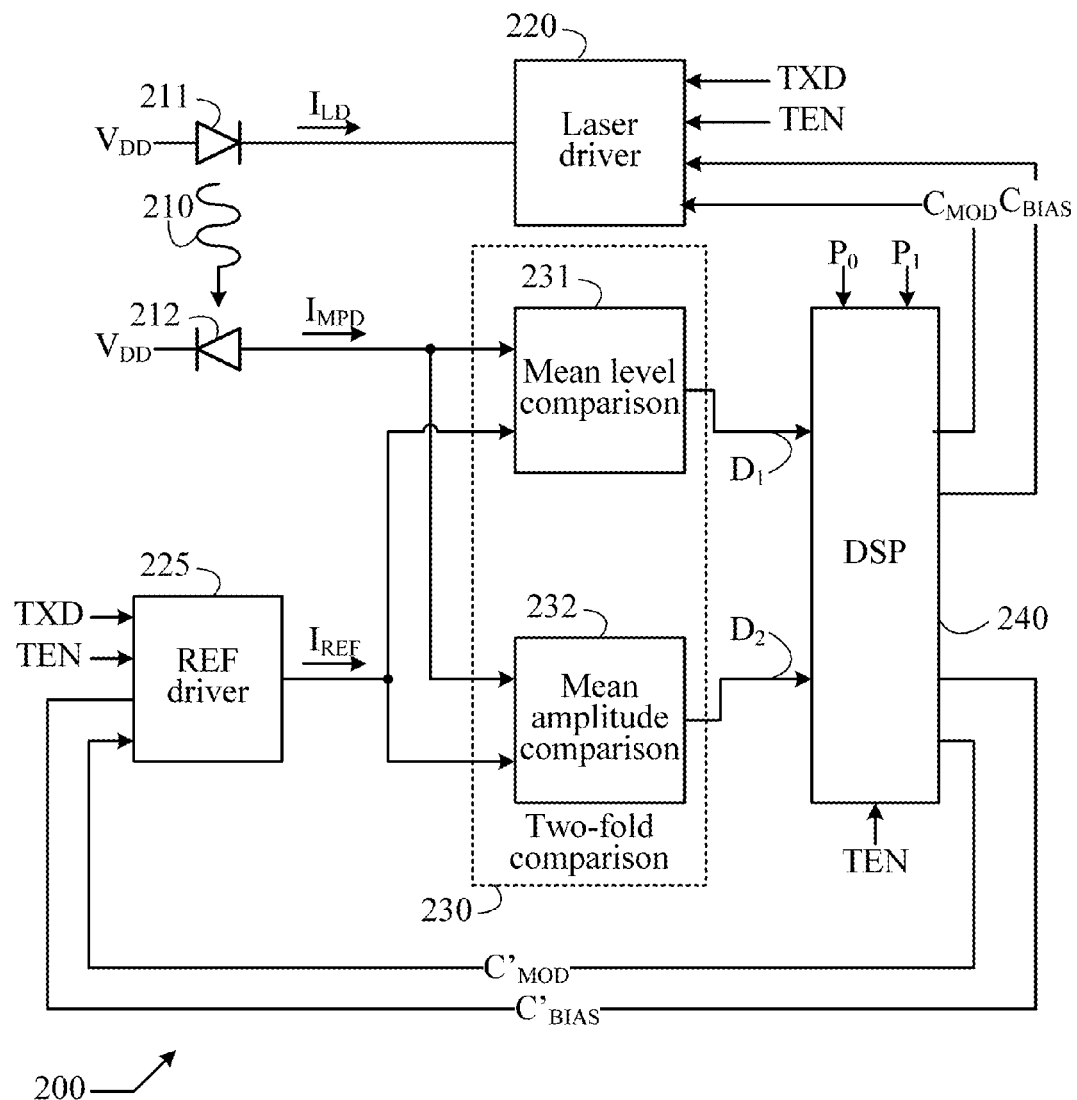
FIG. 2 shows a functional block diagram of a burst mode optical transmitter in accordance with an exemplary embodiment.

A functional block diagram of a burst-mode optical transmitter 200 in accordance with an embodiment is depicted in FIG. 2. The burst-mode optical transmitter 200 includes: a laser driver 220 configured to output a laser diode current $I_{LD}$ to a laser diode 211 in accordance with a transmit data TXD, a transmit enable signal TEN, a bias control code $C_{BIAS}$, and a modulation control code $C_{MOD}$; a monitoring photo diode (hereafter MPD) 212 configured to receive a light signal 210 emitted by the laser diode 211 and output a MPD current $I_{MPD}$; a reference driver (denoted as REF driver in FIG. 2) 225 configured to output a reference current $I_{REF}$ in accordance with the transmit data TXD, the transmit enable signal TEN, a reference bias code $C'_{BIAS}$, and a reference modulation code $C'_{MOD}$; a two-fold comparison circuit 230 including a mean level comparison circuit 231 configured to compare a mean level of the MPD current $I_{MPD}$ with a mean level of the reference current $I_{REF}$ and output a first decision $D_1$ and a mean amplitude comparison circuit 232 configured to compare a mean amplitude of the MPD current $I_{MPD}$ with a mean amplitude of the reference current $I_{REF}$ and output a second decision $D_2$; and a DSP (digital-signal processor) 240 configured to receive the first decision $D_1$ and the second decision $D_2$ and output the bias control code $C_{BIAS}$, the modulation control code $C_{MOD}$, the reference bias code $C'_{BIAS}$, the reference modulation code $C'_{MOD}$, in accordance with the transmit enable signal TEN, a first target level $P_0$, and a second target level $P_1$.

When the transmit enable signal TEN is de-asserted, the laser driver 220 is disabled, and the laser diode current $I_{LD}$ is nil. When the transmit enable signal TEN is asserted, the laser driver 220 is enabled and modulates the laser diode current $I_{LD}$ in accordance with the transmit data TXD. Mathematically, the laser driver 220 embodies the following function:

$$I_{LD} = \begin{cases} 0 & \text{if TEN} = 0 \\ I_{BIAS} & \text{if TEN} = 1 \text{ and } TXD = 0 \\ I_{BIAS} + I_{MOD} & \text{if TEN} = 1 \text{ and } TXD = 1 \end{cases} \quad (1)$$

Here, $I_{BIAS}$ is a bias current controlled by the bias control code $C_{BIAS}$, and $I_{MOD}$ is a modulation current controlled by the modulation control code $C_{MOD}$.

Figure 3:
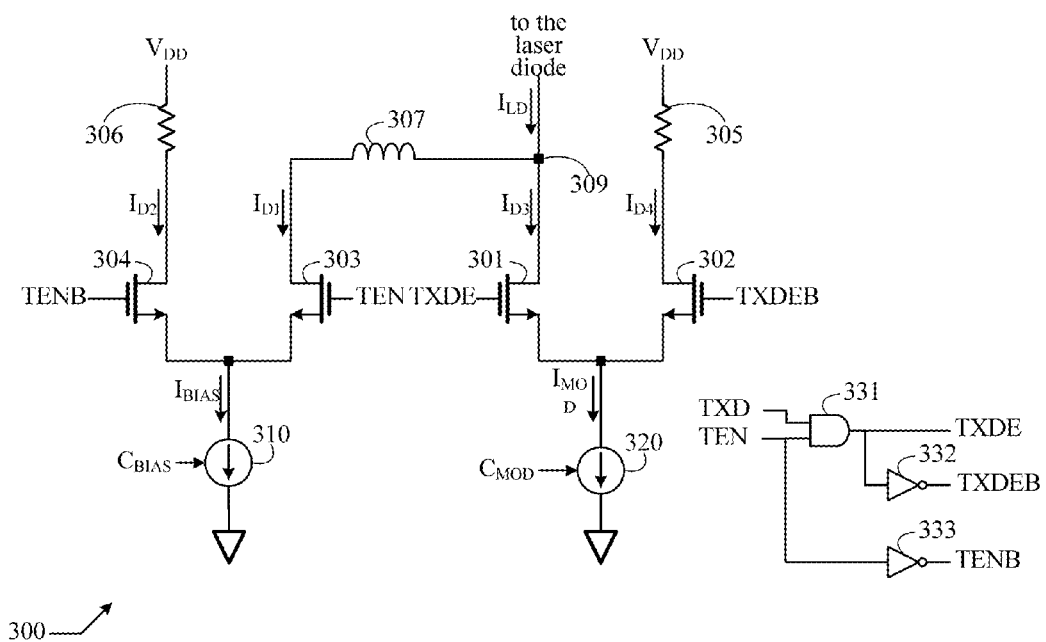
FIG. 3 shows a schematic diagram of a laser driver

An embodiment 300 suitable for embodying the laser driver 220 is depicted in FIG. 3. Embodiment 300 includes: a first current-mode DAC (digital-analog converter) 310 configured to output the bias current $I_{BIAS}$ in accordance with the bias control code $C_{BIAS}$, a second current-mode DAC 320 configured to output the modulation current $I_{MOD}$ in accordance with the modulation control code $C_{MOD}$, a first differential pair including two NMOS (N-channel metal-oxide semiconductor) transistors 303~304 configured to receive the bias current $I_{BIAS}$ and output a first current $I_{D1}$ and a second current $I_{D2}$ in accordance with a value of the transmit enable signal TEN and its logical inversion TENB (see the inverter 333); and a second differential pair including another two NMOS transistors 301~302 configured to receive the modulation current $I_{MOD}$ and output a third current $I_{D3}$ and a fourth current $I_{D4}$ in accordance with a value of a logical signal TXDE and its logical inversion TXDEB (see inverter 332), where TXDE results from a logical AND operation on the transmit data TXD and the transmit enable signal TEN (see the AND gate 331). The first current $I_{D1}$ is summed with the third current $I_{D3}$ at node 309, resulting in the laser diode current $I_{LD}$ that is coupled to the laser diode (see 211 of FIG. 2). An optional inductor 307 is inserted in the path of the first current $I_{D1}$ before $I_{D1}$ is summed with $I_{D3}$ to alleviate a high frequency coupling between the first differential pair 303~304 and the second differentia pair 301~302. When TEN is asserted and TXD is 0, the bias current $I_{BIAS}$ is steered to the laser diode and the laser diode current $I_{LD}$ is substantially equal to $I_{BIAS}$, when TEN is asserted and TXD is 1, both the bias current $I_{BIAS}$ and the modulation current $I_{MOD}$ are steered to the laser diode and the laser diode current $I_{LD}$ is substantially equal to $I_{BIAS+}I_{MOD}$. When TEN is de-asserted, neither the bias current $I_{BIAS}$ nor the modulation current $I_{MOD}$ is steered to the laser diode and the laser diode current $I_{LD}$ will be substantially zero. The second current $I_{D2}$ is terminated with a first pull-up resistor 306, while the fourth current $I_{D4}$ is terminated with a second pull-up resistor 305. The NMOS transistor 304 and the first pull-up resistor 306 are optional but helpful because they allow the first current-mode DAC 310 to be properly terminated when the bias current $I_{BIAS}$ is not steered to the laser diode. Likewise, the NMOS transistor 302 and the second pull-up resistor 305 are optional but helpful because they allow the second current-mode DAC 320 to be properly terminated when the modulation current $I_{MOD}$ is not steered to the laser diode. Current-mode DAC 310 (320) can be implemented by using a summing of outputs from a plurality of current sources, each enabled by a respective bit of the bias (modulation) control code $C_{BIAS}$ ($C_{MOD}$). Current-mode DAC is well known to those of ordinary skill in the art and thus not described in detail here. It is clear that the embodiment 300 embodies the function described by equation (1).

Figure 4:
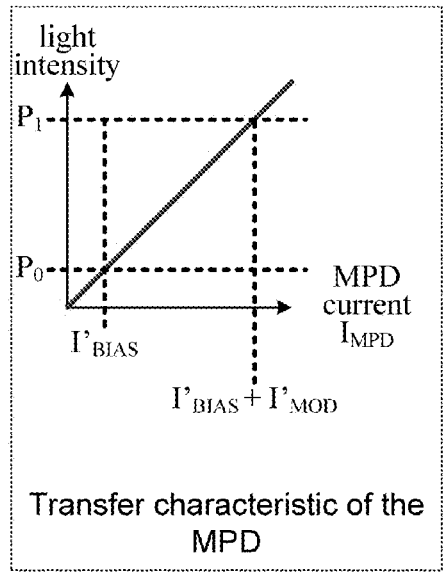
FIG. 4A shows an exemplary electrical-to-optical transfer characteristic of a monitoring photodiode according to an embodiment.
FIG. 4B shows an exemplary optical-to-electrical transfer characteristic of a laser diode according to an embodiment.
Figure 4B:
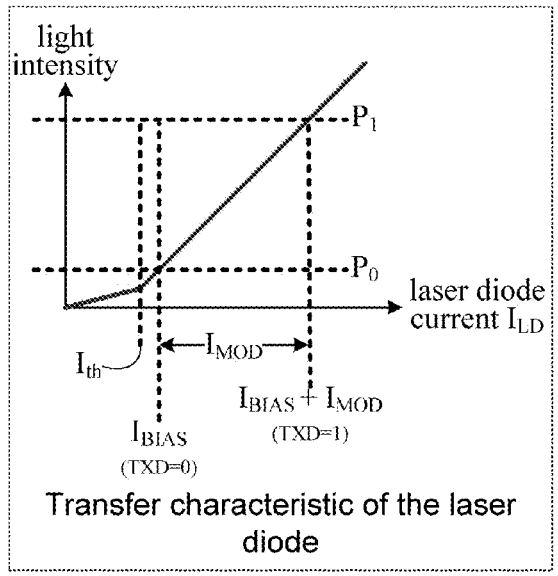

The intensity of the light signal 210 emitted by the laser diode 211 is determined by the laser diode current $I_{LD}$ via an electrical-to-optical transfer characteristic of the laser diode 211. On the other hand, the MPD current $I_{MPD}$ is determined by the intensity of the light signal 210 via an optical-to-electrical transfer characteristic of the MPD 212. An exemplary electrical-to-optical transfer characteristic of the laser diode 211 is shown in FIG. 4B, while an exemplary optical-to-electrical transfer characteristic of the MPD 212 are shown in FIG. 4A. As shown, the light intensity increases approximately linearly with the level of the laser diode current $I_{LD}$ once the laser diode current $I_{LD}$ is above a threshold level $I_{th}$. On the other hand, the MPD current $I_{MPD}$ increases approximately linearly with the light intensity. An important objective of the optical transmitter 200 is to modulate the light signal 210 such that once the transmit enable signal TEN is asserted, the light signal 210 is of the first target level $P_0$ when the transmit data TXD is 0, and of the second target level $P_1$ when the transmit data TXD is 1. Correspondingly, the MPD current $I_{MPD}$ should be of a first reference level denoted as $I'_{BIAS}$ when the transmit data TXD is 0 and of a second reference level denoted as $I'_{1BIAS}+I'_{MOD}$ when the transmit data TXD is 1, wherein $I'_{BIAS}$ is a reference bias current and $I'_{MOD}$ is a reference modulation current and both $I'_{BIAS}$ and $I'_{MOD}$ are determined by $P_0$ and $P_1$ via the optical-to-electrical transfer characteristic of the MPD 212, as shown in FIG. 4A.

In practice, the electrical-to-optical transfer characteristic of the laser diode 211 vary from component to component and are also highly temperature dependent, and can be considered unknown and uncertain. The optical-to-electrical characteristic of the MPD 212, on the other hand, are highly consistent from component to component and also insensitive to temperature, and can be considered pre-known and certain. Despite the uncertainty of the electrical-to-optical transfer characteristic of the laser diode 220, the bias control code $C_{BIAS}$ and the modulation control code $C_{MOD}$ should be established such that the MPD current $I_{MPD}$ is approximately equal to $I'_{BIAS}$ when TXD is 0 and approximately equal to $I'_{1BIAS}+I'_{MOD}$ when TXD is 1. The reference current $I_{REF}$ output from the REF driver 225 is used as a measuring stick for $I_{MPD}$. When the transmit enable signal TEN is de-asserted, the REF driver 225 is disabled, and the reference current $I_{REF}$ is nil. When the transmit enable signal TEN is asserted, the REF driver 225 is enabled and modulates the reference current $I_{REF}$ such that $I_{REF}$ is equal to $I_{BIAS}$ when TXD is 0 and equal to $I'_{BIAS}+I'_{MOD}$ when TXD is 1. Note that $I'_{BIAS}$ and $I'_{MOD}$ are pre-known and certain once $P_0$ and $P_1$ are specified since the optical-to-electrical transfer characteristic of the MPD 212 are pre-known and certain. Mathematically, the REF driver 225 embodies the following function:

$$I_{REF} = \begin{cases} 0 & \text{if TEN} = 0 \\ I'_{BIAS} & \text{if TEN} = 1 \text{ and } TXD = 0 \\ I'_{BIAS} + I'_{MOD} & \text{if TEN} = 1 \text{ and } TXD = 1 \end{cases} \quad (2)$$

Ideally, the MPD current $I_{MPD}$ matches the reference current $I_{REF}$. When that happens, it indicates that the intensity of the light signal 210 is modulated to either $P_0$ or $P_1$ depending on the transmit data TXD, as expected. If the MPD current $I_{MPD}$ does not match the reference current $I_{REF}$, the bias control code $C_{BIAS}$ and the modulation control code $C_{MOD}$ should be adjusted. However, both $I_{MPD}$ and $I_{REF}$ are usually high frequency signals that are difficult to compare accurately directly. In particular, the MPD current $I_{MPD}$ may exhibit a ringing behavior as mentioned earlier and thus difficult to detect accurately directly. Instead, a mean level and a mean amplitude are compared. When $I_{MPD}$ and $I_{REF}$ have the mean level, and also have the same mean amplitude, it indicates that the intensity of the light signal 210 is modulated to either $P_0$ or $P_1$ depending on the transmit data TXD, as expected.

The REF driver 225 is used to embody the function described in equation (2), while the laser driver 220 is used to embody the function described in equation (1). Note that equation (1) and equation (2) are the same, except that the roles of $I_{LD}$, $I_{BIAS}$, are $I_{MOD}$ in equation (1) are replaced by the roles of $I_{REF}$, $I'_{BIAS}$, are $I'_{MOD}$, respectively. However, $I_{LD}$ is flowing into laser driver 220, while $I_{REF}$ is flowing out of REF driver 225. Therefore, a "flipped" revision of embodiment 300 of FIG. 3 can be used to embody the REF driver 225. It can be simply done by replacing $C_{BIAS}$, $C_{MOD}$, $I_{BIAS}$, $I_{MOD}$, and $I_{LD}$ with $C'_{BIAS}$, $C'_{MOD}$, $I'_{BIAS}$, $I'_{MOD}$, and $I_{REF}$, respectively, but every NMOS transistor must be replaced with a PMOS transistor, and the roles of $V_{DD}$ and ground must be swapped. It is well known in prior art that a "flipped" version (wherein PMOS transistor and NMOS transistor are swapped, and also power and ground are swapped) of a circuit has the same function except the direction of the current flow is reversed.

The mean level comparison circuit 231 compares a mean value of $I_{MPD}$ with a mean value of $I_{REF}$, while the mean amplitude comparison circuit 232 compares a mean amplitude of $I_{MPD}$ with a mean amplitude of $I_{REF}$. In an embodiment, the two currents $I_{MPD}$ and $I_{REF}$ are converted to a MPD voltage $V_{MPD}$ and a reference voltage $V_{REF}$, respectively, using a current-to-voltage conversion circuit in accordance with the following two equations:

$$V_{MPD} = R_{TIA} \cdot I_{MPD} \qquad (3)$$

$$V_{REF} = R_{TIA} \cdot I_{REF}. \qquad (4)$$

Here, $R_{TIA}$ is a conversion gain of the current-to-voltage conversion circuit. The current-to-voltage conversion circuit can be embodied using a TIA (trans-impedance amplifier), which is well known in the prior art and thus not described in detail here.

Based on the two voltages $V_{MPD}$ and $V_{REF}$, the mean level comparison circuit 231 performs the following function:

$$D_1 = \begin{cases} \text{undefined} & \text{if TEN} = 0 \\ 1 & \text{if TEN} = 1 \text{ and } \langle V_{MPD} \rangle > \langle V_{REF} \rangle \\ 0 & \text{if TEN} = 1 \text{ and } \langle V_{MPD} \rangle < \langle V_{REF} \rangle \end{cases} \qquad (5)$$

Here, $\langle \cdot \rangle$ denotes an averaging operation. On the other hand, the mean amplitude comparison circuit 232 performs the following function:

$$D_2 = \begin{cases} \text{undefined} & \text{if TEN} = 0 \\ 1 & \text{if TEN} = 1 \text{ and } \langle |V_{MPD} - \langle V_{MPD} \rangle| \rangle > \langle |V_{REF} - \langle V_{REF} \rangle| \rangle \\ 0 & \text{if TEN} = 1 \text{ and } \langle |V_{MPD} - \langle V_{MPD} \rangle| \rangle < \langle |V_{REF} - \langle V_{REF} \rangle| \rangle \end{cases} \qquad (6)$$

Here, $|\cdot|$ denotes taking an absolute value. Note that $\langle |V_{MPD} - \langle V_{MPD} \rangle| \rangle$ is a mean amplitude of $V_{MPD}$, while $\langle |V_{REF} - \langle V_{REF} \rangle| \rangle$ is a mean amplitude of $V_{REF}$.

Figure 5:
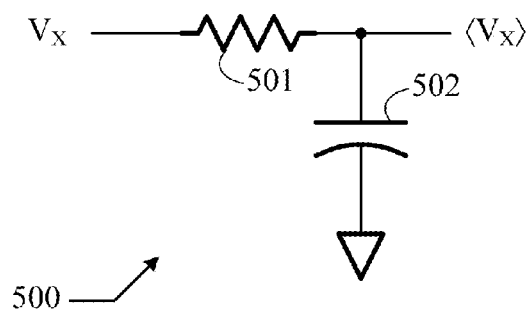
FIG. 5 shows a schematic diagram of a low-pass filter.

In an embodiment depicted in FIG. 5, a low-pass filter 500 is used for performing the averaging operation needed in equation (5) to obtain $\langle V_{MPD} \rangle$ and $\langle V_{REF} \rangle$. Low-pass filter 500 receives an input voltage $V_X$ and outputs an average voltage $\langle V_X \rangle$. Low-pass filter 500 includes a series resistor 501 and a shunt capacitor 502. Low-pass filter 500 is a circuit that is well known to those of ordinary skill in the art and thus not explained in detail here. Low-pass filter 500 can be used to obtain $\langle V_{MPD} \rangle$, simply by replacing $V_X$ with $V_{MPD}$. Likewise, low-pass filter 500 can be used to obtain $\langle V_{REF} \rangle$, simply by replacing $V_X$ with $V_{REF}$. Once $\langle V_{MPD} \rangle$ and $\langle V_{REF} \rangle$ are obtained, they can be compared using a comparator, resulting in the first decision $D_1$. Comparator is well known in the art and thus not described in detail here.

Figure 6A:
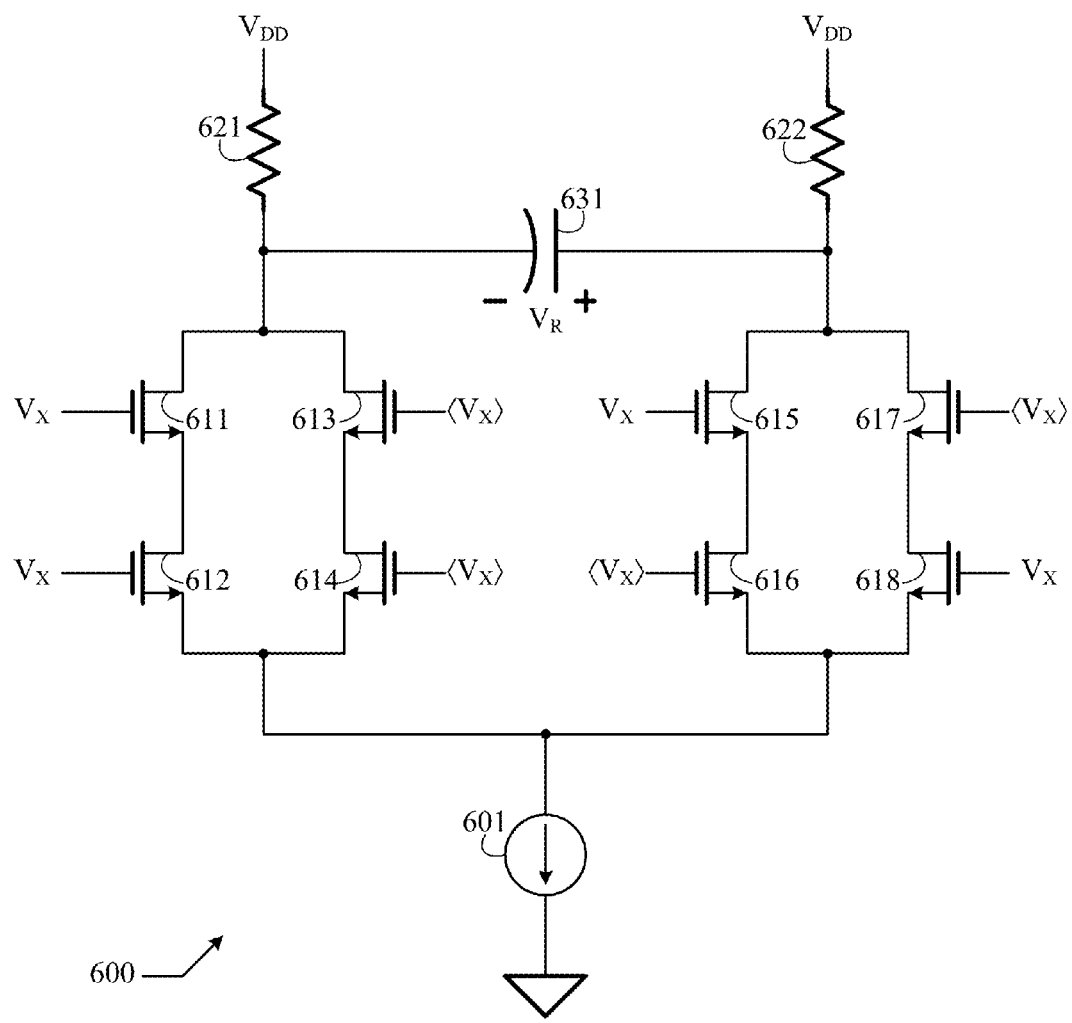
FIG. 6A shows a schematic diagram of a rectifier.
Figure 6B:
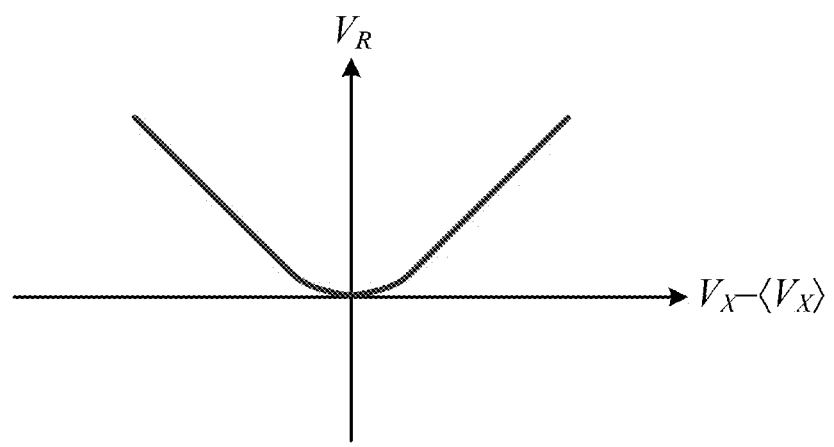
FIG. 6B shows a transfer characteristic of the rectifier of FIG. 6A.

In an embodiment depicted in FIG. 6A, a rectifier 600 is used for performing the operations needed to obtain $\langle |V_{MPD} - \langle V_{MPD} \rangle| \rangle$ and $\langle |V_{REF} - \langle V_{REF} \rangle| \rangle$. Rectifier 600 includes a current source 601, eight NMOS transistors 611~618, two resistors 621 and 622, and one capacitor 631. Rectifier 600 receives an input voltage $V_X$ along with its average $\langle V_X \rangle$ and output an average amplitude $V_R$. FIG. 6B depicts a transfer characteristic of rectifier 600, wherein $V_R$ is an even function of $V_X - \langle V_X \rangle$ and approximately proportional to $|V_X - \langle V_X \rangle|$, thus fulfilling a rectification function. Rectifier 600 is taught by Lin in U.S. Pat. No. 8,854,028, incorporated by reference, and not described in detail here. Capacitor 631 effectively performs an averaging function on $V_R$. When $V_X$ and $\langle V_X \rangle$ are replaced with $V_{MPD}$ and $\langle V_{MPD} \rangle$, respectively, $V_R$ can be used as an estimate of $\langle |V_{MPD} - \langle V_{MPD} \rangle| \rangle$. Likewise, when $V_X$ and $\langle V_X \rangle$ are replaced with $V_{REF}$ and $\langle V_{REF} \rangle$, respectively, $V_R$ can be used as an estimate of $\langle |V_{REF} - \langle V_{REF} \rangle| \rangle$. Once the estimates of $\langle |V_{MPD} - \langle V_{MPD} \rangle| \rangle$ and $\langle |V_{REF} - \langle V_{REF} \rangle| \rangle$ are available, they can be compared using a comparator, resulting in the second decision $D_2$.

In rectifier 600, $V_R$ is merely an estimate of $\langle |V_X - \langle V_X \rangle| \rangle$ that may not be accurate. In fact, the estimate is subject to an error. However, the error is systematic and common to both the estimate of $\langle |V_{MPD} - \langle V_{MPD} \rangle| \rangle$ and the estimate of $\langle |V_{REF} - \langle V_{REF} \rangle| \rangle$. In other words, the errors in the estimates of $\langle |V_{MPD} - \rangle V_{MPD} \rangle| \rangle$ and $\langle |V_{REF} - \langle V_{REF} \rangle| \rangle$ using rectifier 600 are common and will cancel one another when they are compared. As a result, the second decision $D_2$ is still reliable and accurately indicative of whether $\langle |V_{MPD} - \langle V_{MPD} \rangle| \rangle$ is greater than $\langle |V_{REF} - \langle V_{REF} \rangle| \rangle$, even though $\langle |V_{MPD} - \langle V_{MPD} \rangle| \rangle$ and $\langle |V_{REF} - \langle V_{REF} \rangle| \rangle$ themselves are not estimated accurately.

Given the two target levels $P_0$ and $P_1$, the DSP 240 finds the corresponding values of the reference bias current $I'_{BIAS}$ and reference modulation current $I'_{MOD}$ based on the optical-to-electrical transfer characteristic of the MPD 212, and thus determines the reference bias code $C'_{BIAS}$ and the reference modulation code $C'_{MOD}$ accordingly. DSP 240 then adjusts the bias code $C_{BIAS}$ and the modulation code $C_{MOD}$ in a closed-loop manner in accordance with the first decision $D_1$ and the second decision $D_2$. In an embodiment, the DSP 240 adjusts the bias code $C_{BIAS}$ and the modulation code $C_{MOD}$ in accordance with the following truth table:

|       | $D_1 = 0$ | $D_1 = 1$ |
|---|---|---|
| $D_2 = 0$ | Increment $C_{MOD}$ | Decrement $C_{BIAS}$ and increment $C_{MOD}$ |
| $D_2 = 1$ | Increment $C_{BIAS}$ and decrement $C_{MOD}$ | Decrement $C_{MOD}$ |

When $D_1$ and $D_2$ are both 0, indicating both the mean level and the mean amplitude of $I_{MPD}$ are too low, the DSP 240 will increment $C_{MOD}$ to raise both the mean level and the mean amplitude of $I_{LD}$, thus raising both the mean level and the mean amplitude of $I_{MPD}$. When $D_1$ is 0 and $D_2$ is 1, indicating the mean level of $I_{MPD}$ is too low but the mean amplitude is too high, the DSP 240 will increment $C_{BIAS}$ to raise the mean level of $I_{LD}$ and decrement $C_{MOD}$ to lower the mean amplitude of $I_{LD}$, thus raising the mean level of $I_{MPD}$ but lowering the mean amplitude of $I_{MPD}$. When $D_1$ is 1 and $D_2$ is 0, indicating the mean level of $I_{MPD}$ is too high but the mean amplitude is too low, the DSP 240 will decrement $C_{BIAS}$ to lower the mean level of $I_{LD}$ and increment $I_{MOD}$ to raise the mean amplitude of $I_{LD}$, thus lowering the mean level of $N_{MPD}$ but raising the mean amplitude of $N_{PD}$. When $D_1$ and $D_2$ are both 1, indicating both the mean level and the mean amplitude of $I_{MPD}$ are too high, the DSP 240 will decrement $C_{MOD}$ to lower both the mean level and the mean amplitude of $I_{LD}$, thus lowering both the mean level and the mean amplitude of $I_{MPD}$.

As mentioned earlier, to embody the functions of the mean level comparison circuit 231 and the mean amplitude comparison circuit 232, circuits such as TIA (for current-to-voltage conversion), low-pass filter (for averaging), and rectifier (for estimating amplitude) are needed for both the MPD current $I_{MPD}$ and the reference current $I_{REF}$ in order to find their respective mean level and mean amplitude so that comparisons could be made to determine the first decision $D_1$ and the second decision $D_2$. In one embodiment, two sets of circuits are used, each including a TIA, a low-pass filter, and a rectifier, wherein one of the two sets is used to find a mean level and a mean amplitude of $N_{PD}$, while the other is used to find a mean level and a mean amplitude of $I_{REF}$. The mean level of $I_{MPD}$ is directly compared with the mean level of $I_{REF}$ to determine $D_1$, while the mean amplitude of $I_{MPD}$ is directly compared with the mean amplitude of $I_{REF}$ to determine $D_2$. A drawback of this embodiment is that: there may exist some mismatches between the two sets of circuits that may lead to errors. To eliminate the errors due to the mismatches, calibration is needed. In an alternative embodiment, only one set of circuits is used, which takes turns detecting $I_{MPD}$ and $I_{REF}$. In this alternative embodiment, an analog-to-digital conversion using an analog-to-digital converter (ADC) is needed. When processing $N_{PD}$, the mean level $\langle I_{MPD} \rangle$ is detected and converted to a first digital word $L_{MPD}$, and the mean amplitude $\langle |V_{MPD} - \langle V_{MPD} \rangle| \rangle$ is detected and converted to a second digital word $A_{MPD}$. When processing $I_{REF}$, the mean level $\langle I_{REF} \rangle$ is detected and converted to a third digital word $L_{REF}$, and the mean amplitude $\langle |V_{REF} - \langle V_{REF} \rangle| \rangle$ is detected and converted to a fourth digital word $A_{REF}$. The mean level comparison circuit 231 then compares $L_{MPD}$ with $L_{REF}$, which is equivalent to comparing $\langle I_{MPD} \rangle$ with $\langle I_{REF} \rangle$, to determine $D_1$. Likewise, the mean amplitude comparison circuit 232 compares $A_{MPD}$ with $A_{REF}$, which is equivalent to comparing $\langle |V_{MPD} - \langle V_{MPD} \rangle| \rangle$ with $\langle |V_{REF} - \langle V_{REF} \rangle| \rangle$, to determine $D_2$.

Although a burst-mode optical transmitter is used here as example, according to an exemplary embodiment it can also be used in a continuous mode optical transmitter, wherein the transmit enable signal TEN needs to be asserted all the time; in this case, TEN is stationary and no longer a meaningful variable signal, and thus can be removed from FIG. 2. Also note that, in the burst mode optical transmitter 200, $I_{MPD}$ and $I_{REF}$ are meaningful only when TEN is asserted. Consequently, $D_1$ and $D_2$ are meaningful only when TEN is asserted. The DSP 240 should disregard $D_1$ and $D_2$ when TEN is de-asserted and should not adapt $C_{BIAS}$ and $C_{MOD}$ based on the values of $D_1$ and $D_2$ when they are meaningless.

Figure 7:
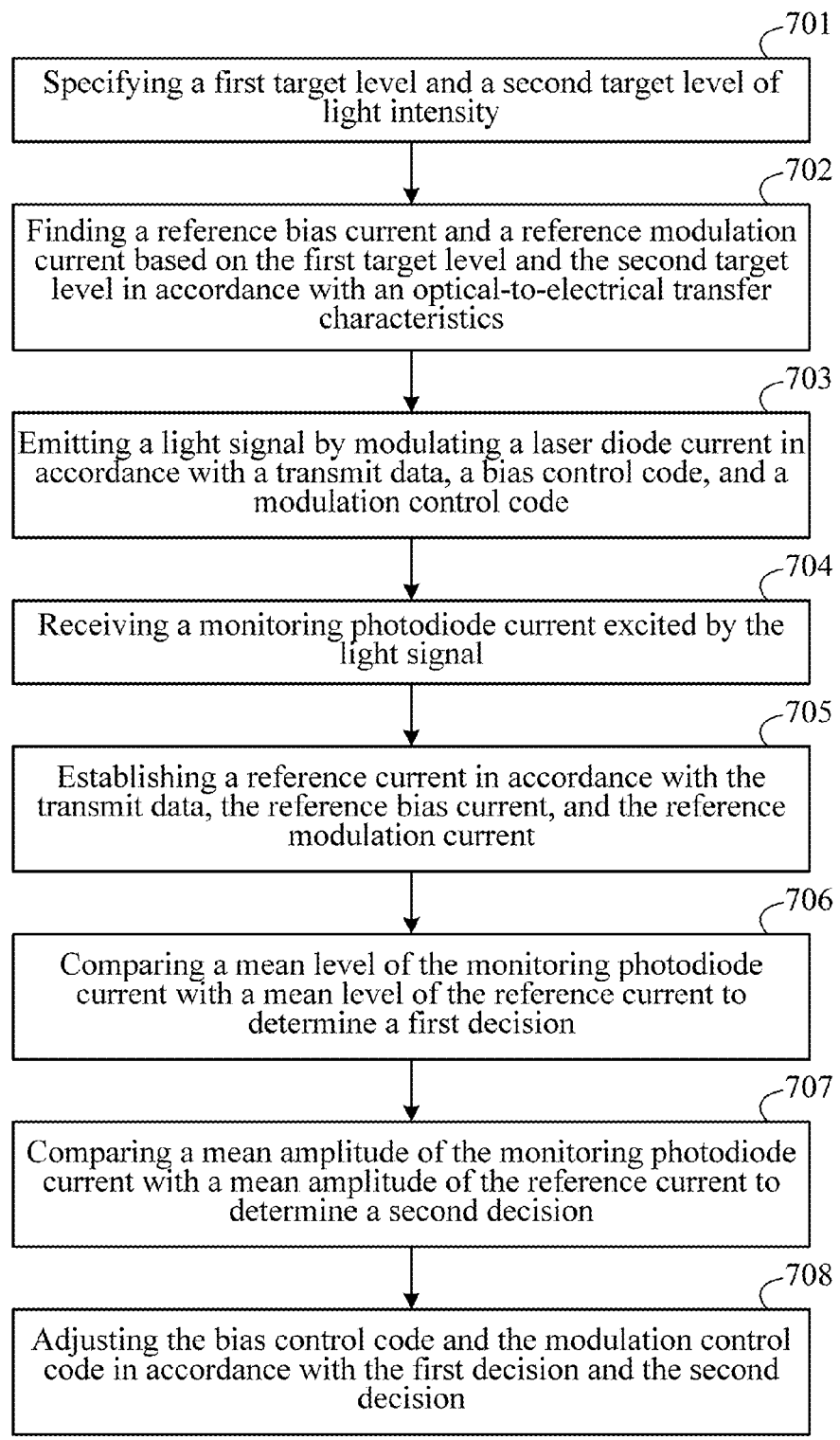
FIG. 7 shows a flow diagram of a method in accordance with an exemplary embodiment.

In an embodiment illustrated by a flow diagram shown in FIG. 7, a method includes: step 701 of "Specifying a first target level and a second target level of light intensity"; step 702 of "Finding a reference bias current and a reference modulation current based on the first target level and the second target level in accordance with an optical-to-electrical transfer characteristic"; step 703 of "Emitting a light signal by modulating a laser diode current in accordance with a transmit data, a transmit enable signal, a bias control code, and a modulation control code"; step 704 of "Receiving a monitoring photodiode current excited by the light signal"; step 705 of "Establishing a reference current in accordance with the transmit data, the reference bias current, and the reference modulation current"; step 706 of "Comparing a mean level of the monitoring photodiode current with a mean level of the reference current to determine a first decision"; step 707 of "Comparing a mean amplitude of the monitoring photodiode current with a mean amplitude of the reference current to determine a second decision"; and step 708 of "Adjusting the bias control code and the modulation control code in accordance with the first decision and the second decision." These steps are provided to establish reliable light detection and/or output levels of an optical transmitter.

Those skilled in the art will readily observe that numerous modifications and alterations of the device and method may be made while retaining the teachings of the inventive concept. Accordingly, the above disclosure should be construed as limited only by the appended claims and their equivalents.

What is claimed is:

1. An apparatus comprising:
   a laser driver configured to output a laser diode current in accordance with a transmit data, a bias control code, and a modulation control code;
   a laser diode configured to receive the laser diode current and output a light signal;
   a monitoring photodiode configured to receive the light signal and output a monitoring photodiode current;
   a reference driver configured to output a reference current in accordance with the transmit data, a reference bias code, and a reference modulation code;
   a two-fold comparison circuit configured to receive the monitoring photodiode current and the reference current and output a first decision and a second decision; and
   a digital signal processor configured to receive the first decision and the second decision and output the bias control code, the modulation control code, the reference bias code, and the reference modulation code in accordance with a first target level and a second target level, wherein: the first decision is a result of comparison between a mean level of the monitoring photodiode current and a mean level of the reference current, and the second decision is a result of comparison between a mean amplitude of the monitoring photodiode current and a mean amplitude of the reference current.

2. The apparatus of claim 1, wherein the two-fold comparison circuit comprises a mean level comparison circuit configured to establish the first decision by comparing the mean level of the monitoring photodiode current and the mean level of the reference current, and a mean amplitude comparison circuit configured to establish the second decision by comparing the mean amplitude of the monitoring photodiode current with the mean amplitude of the reference current.

3. The apparatus of claim 1, wherein the two-fold comparison circuit comprises a trans-impedance amplifier, a low-pass filter, and a rectifier.

4. The apparatus of claim 1, wherein the mean level of the monitoring photodiode current is detected by using a trans-impedance amplifier followed by a low-pass filter.

5. The apparatus of claim 1, wherein the mean level of the reference current is detected by using a trans-impedance amplifier followed by a low-pass filter.

6. The apparatus of claim 1, wherein the mean amplitude of the monitoring photodiode current is detected by using a rectifier rectifying a monitoring photodiode voltage converted from the monitoring photodiode current using a trans-impedance amplifier.

7. The apparatus of claim 1, wherein the mean amplitude of the reference current is detected by using a rectifier rectifying a reference voltage converted from the reference current using a trans-impedance amplifier.

8. The apparatus of claim 1, wherein the reference bias code and the reference modulation code are established based on the first target level, the second target level, and an optical-to-electrical transfer characteristic of the monitoring photodiode.

9. A method comprising:
specifying a first target level and a second target level of light intensity for an optical transmitter;
finding a reference bias current and a reference modulation current based on the first target level and the second target level in accordance with an optical-to-electrical transfer characteristic;
emitting a light signal by modulating a laser diode current in accordance with a transmit data, a bias control code, and a modulation control code;
receiving a monitoring photodiode current excited by the light signal;
establishing a reference current in accordance with the transmit data, the reference bias current, and the reference modulation current;
comparing a mean level of the monitoring photodiode current with a mean level of the reference current to determine a first decision;
comparing a mean amplitude of the monitoring photodiode current with a mean amplitude of the reference current to determine a second decision; and
adjusting the bias control code and the modulation control code in accordance with the first decision and the second decision;
providing an adjusted light output by the optical transmitter using the adjusted bias control code.

10. The method of claim 9, wherein the mean level of the monitoring photodiode current is detected by using a trans-impedance amplifier followed by a low-pass filter.

11. The method of claim 9, wherein the mean level of the reference current is detected by using a trans-impedance amplifier followed by a low-pass filter.

12. The method of claim 9, wherein the mean amplitude of the monitoring photodiode current is detected by using a rectifier rectifying a monitoring photodiode voltage converted from the monitoring photodiode current using a trans-impedance amplifier.

13. The method of claim 9, wherein the mean amplitude of the reference current is detected by using a rectifier rectifying a reference voltage converted from the reference current using a trans-impedance amplifier.

* * * * *